United States Patent
Bakas

(10) Patent No.: US 7,806,351 B1
(45) Date of Patent: Oct. 5, 2010

(54) STOWABLE WASHER FOR VEHICLE UNDERCARRIAGE, AND HINGE MOTION STOP AND ELEVATION CONTROL FOR STOWABLE WASHERS AND THE LIKE

(76) Inventor: John Bakas, 514 N. Gilbert St., Iowa City, IA (US) 52245-2132

( * ) Notice: Subject to any disclaimer, the term of this patent is extended or adjusted under 35 U.S.C. 154(b) by 703 days.

(21) Appl. No.: 11/496,601

(22) Filed: Jul. 31, 2006

Related U.S. Application Data

(60) Provisional application No. 60/704,468, filed on Aug. 1, 2005.

(51) Int. Cl.
| | |
|---|---|
| *B05B 3/00* | (2006.01) |
| *B65H 75/00* | (2006.01) |
| *B65H 16/02* | (2006.01) |
| *B05B 9/01* | (2006.01) |
| *B05B 15/06* | (2006.01) |
| *B05B 15/08* | (2006.01) |
| *A62C 31/24* | (2006.01) |
| *F16L 3/08* | (2006.01) |
| *F16L 3/00* | (2006.01) |
| *A47G 29/00* | (2006.01) |
| *A47H 1/10* | (2006.01) |
| *F16M 13/00* | (2006.01) |

(52) U.S. Cl. .................. 239/754; 239/195; 239/196; 239/197; 239/722; 239/280; 239/532; 239/526; 239/588; 242/570; 248/328; 248/329; 248/51; 248/521; 248/523; 248/525; 248/528; 248/82; 248/84; 248/65

(58) Field of Classification Search ................ 239/195, 239/196, 197, 754, 722, 280, 532, 526, 588; 242/570; 248/328, 329, 51, 521, 523, 525, 248/528, 82, 84, 86, 88, 65
See application file for complete search history.

(56) References Cited

U.S. PATENT DOCUMENTS

| 550,040 | A | * | 11/1895 | Busha | 182/51 |
|---|---|---|---|---|---|
| 902,801 | A | * | 11/1908 | Bergland | 137/355.12 |
| 1,278,236 | A | * | 9/1918 | Sieben | 239/745 |
| 2,581,678 | A | * | 1/1952 | Malin et al. | 239/104 |
| 2,588,842 | A | * | 3/1952 | Hutt | 248/82 |

(Continued)

*Primary Examiner*—Len Tran
*Assistant Examiner*—Steven M Cernoch

(57) ABSTRACT

A stowable device for ejecting fluids onto the underside and wheel regions of a vehicle includes a base member joined at one end to a handle member such that the angle between the members can be controllably varied and retained at a desired angle. A source of fluid is coupled through flexible tubing terminating in a fluid jet disposed adjacent the base member distal end. The desired angle is determined by a length of cord extending from base to handle member. The exposed cord length is user-controllable by lockably spooling excess cord length into a rotatable spool reservoir attached to the handle member. User-adjustment of the desired angle also determined handle height above ground. Alternatively, the desired angle (and handle height above ground) is user-determined by adjusting effective length of a rigid rod.

20 Claims, 16 Drawing Sheets

U.S. PATENT DOCUMENTS

| | | | |
|---|---|---|---|
| 3,002,695 A * | 10/1961 | Matthewson | 239/146 |
| 3,050,260 A * | 8/1962 | Macrae et al. | 239/150 |
| 3,420,546 A * | 1/1969 | Jasovsky | 280/421 |
| 3,628,728 A * | 12/1971 | Polutnik et al. | 239/159 |
| 4,042,184 A * | 8/1977 | Langenohl | 242/388.9 |
| 4,138,042 A * | 2/1979 | Okada | 222/529 |
| 4,181,259 A * | 1/1980 | Ridgway | 239/206 |
| 4,343,211 A * | 8/1982 | Volle | 83/177 |
| 4,580,726 A * | 4/1986 | Unger | 239/722 |
| 4,896,686 A * | 1/1990 | Schmidt et al. | 134/167 C |
| 4,984,746 A * | 1/1991 | Joyal | 239/722 |
| 5,052,648 A * | 10/1991 | Landau | 248/235 |
| 5,269,464 A * | 12/1993 | Epple et al. | 239/130 |
| 5,303,866 A * | 4/1994 | Hawks, Jr. | 239/142 |
| 5,471,270 A * | 11/1995 | Balling | 396/411 |
| 5,593,116 A * | 1/1997 | Pettesch et al. | 248/75 |
| 5,727,765 A * | 3/1998 | Alvern | 248/329 |
| 5,741,090 A * | 4/1998 | Dunning et al. | 405/263 |
| 5,816,499 A * | 10/1998 | Christiansen | 239/198 |
| 5,890,654 A * | 4/1999 | Dupre | 239/14.2 |
| 5,908,156 A * | 6/1999 | Dupre | 239/14.2 |
| 6,016,970 A * | 1/2000 | Dupre | 239/14.2 |
| 6,039,265 A * | 3/2000 | Dupre et al. | 239/14.2 |
| 6,045,064 A * | 4/2000 | Abraham | 239/722 |
| 6,182,906 B1 * | 2/2001 | Dupre | 239/14.2 |
| 6,199,579 B1 * | 3/2001 | Taylor et al. | 137/355.22 |
| 6,247,658 B1 * | 6/2001 | Bakas | 239/722 |
| 6,676,059 B1 * | 1/2004 | Bell et al. | 242/379.1 |
| 6,745,959 B2 * | 6/2004 | Reid | 239/747 |

* cited by examiner

STOWABLE WASHER FOR VEHICLE UNDERCARRIAGE, AND HINGE MOTION STOP AND ELEVATION CONTROL FOR STOWABLE WASHERS AND THE LIKE

RELATION TO CO-PENDING APPLICATION

Priority is claimed from co-pending U.S. provisional patent application Ser. No. 60/704,468, filed 1 Aug. 2005 by applicant John Bakas herein, entitled "Stowable Washer for Vehicle Undercarriage and Hinge Motion Stop and Elevation Control for Such".

FIELD OF THE INVENTION

The present invention relates to hingeable stowable devices for washing the undercarriage of vehicles, and more preferably to mechanisms to control hinge motion and elevation for such washer devices, and other hingeable devices.

BACKGROUND OF THE INVENTION

U.S. Pat. No. 6,247,658 B1 (2001) was issued to applicant herein and is entitled STOWABLE WASHER FOR VEHICLE UNDERCARRIAGE. The '658 patent disclosed a device (termed "washer" herein) that directs fluid against the underside of vehicles to flush away dirt, debris, and other deposits, and to apply substances to the underside of vehicles. Applicant refers to and incorporates by reference herein his U.S. Pat. No. 6,247,658 B1.

FIG. 1 herein is replicated from U.S. Pat. No. 6,247,658 B1. FIG. 1 shows washer 10 as including a base member 70 hingedly joined at one end, by a mechanism 90, to an elongated handle member 80, such that the angle $\phi$ (phi) between members 70 and 80 could vary. A generic mechanism 240 was used to lock angle $\phi$ at a preset maximum value, e.g. perhaps 110°. A source of pressurized fluid 190 was coupled to the device to be directed from outlet jet 110 onto vehicle undercarriages to flush away debris such as 20 and to apply substances to undercarriages.

Wheels 100 allowed a user to manipulate washer 10 into position, and if desired to cantilever the fluid outlet jet 110 upward to better direct fluid flow 130 into hard to reach undercarriage areas. The outflow of fluid from jet 110 created a downward force that, when coupled to a cantilevering force, tended to maximize angle $\phi$ to whatever value mechanism 240 permitted. When not in use, washer 10 advantageously hinged closed (e.g.: $\phi=0°$), which facilitated storage. It is seen from FIG. 1 that there was no offset between base member 70 and handle member 80.

While washer 10, as described in the U.S. Pat. No. 6,247,658 B1, worked admirably, applicant discovered the usefulness of a lateral (side-to-side) offset between the base and handle members, and/or a lateral offset relative to either or both the base and handle members and the wheels. Applicant also discovered the utility of a bi-laterally offset fluid conducting hinge between the base and handle members, as well as a user-changeable fluid outlet jet mechanism. Further, applicant has discovered a simpler mechanism to maintain hinge motion at a desired angle $\phi$, and to permit user-alteration of the distance between handle 160 and the ground.

The present invention provides such a washer, and mechanisms.

SUMMARY OF THE INVENTION

A stowable washer to eject fluid onto the underside of a vehicle, which includes a hinged-together handle member and base member. The fluid passes through the handle and base members, and exists through a jet that preferably is user-replaceable and user adjustable.

The maximum angle $\phi$ defined between the handle and base member is controlled preferably using a spoolable cord mechanism such that the exposed length of cord between the handle and the base member determines and fixes the desired maximum angle $\phi$. One end of a length of spoolable cord is secured to one of the base and handle members, and the other end of the spoolable cord is wound within a cord reservoir on the other member. Rotation of the cord reservoir in one direction can unspool and thus release cord length, which increases the angle $\phi$, and rotation of the cord reservoir in the other direction spools or retrieves exposed cord length, which decreases angle $\phi$. This mechanism can help adjust the upper end of the handle member to compensate for users of different heights. Another mechanism adjusts and locks maximum angle $\phi$ by varying the effective length of a rod extending between handle and base members.

Other embodiments provide offsets and bends between handle and base members, and offset in the wheels on the base member that can support the device in use.

Other features and advantages of the invention will appear from the following description in which the preferred embodiments have been set forth in detail, in conjunction with the accompanying drawings.

DETAILED DESCRIPTION OF THE PRESENT INVENTION

Figure 1:
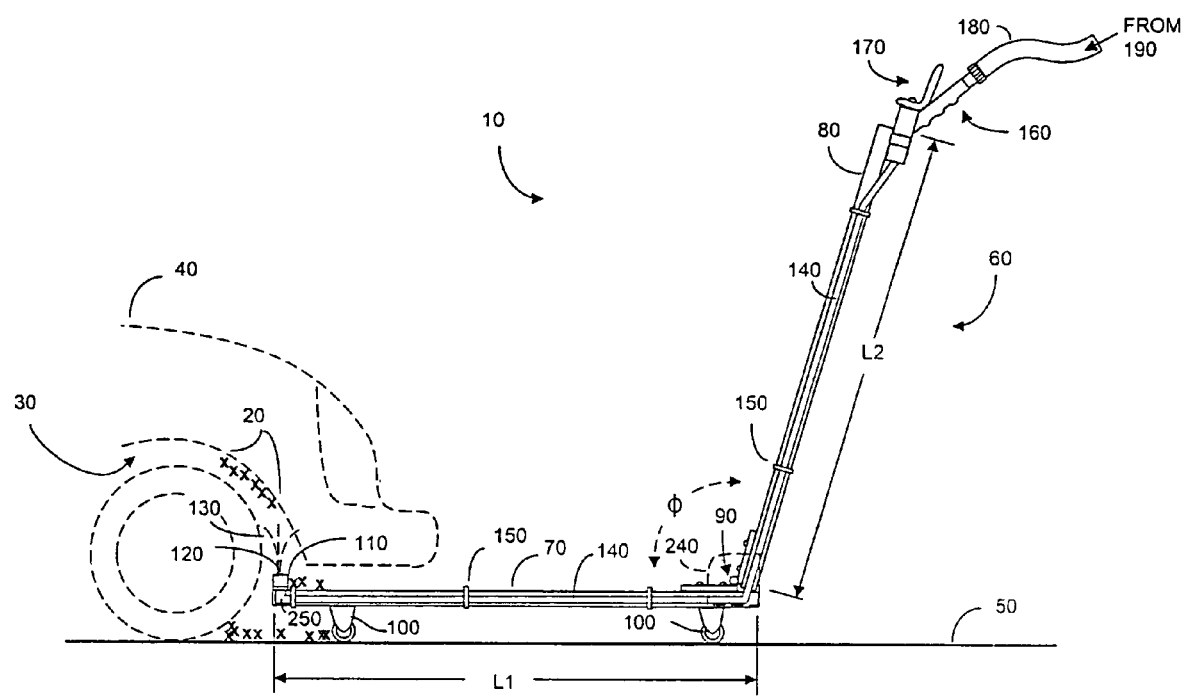
FIG. 1 depicts a stowable washer, according to U.S. Pat. No. 6,247,658 B1.

Unless otherwise noted, reference numerals used herein that are identical to reference numerals used in applicant's U.S. Pat. No. 6,247,658 B1, may be considered to be substantially if not identically the same elements described in that patent.

Figure 2A:
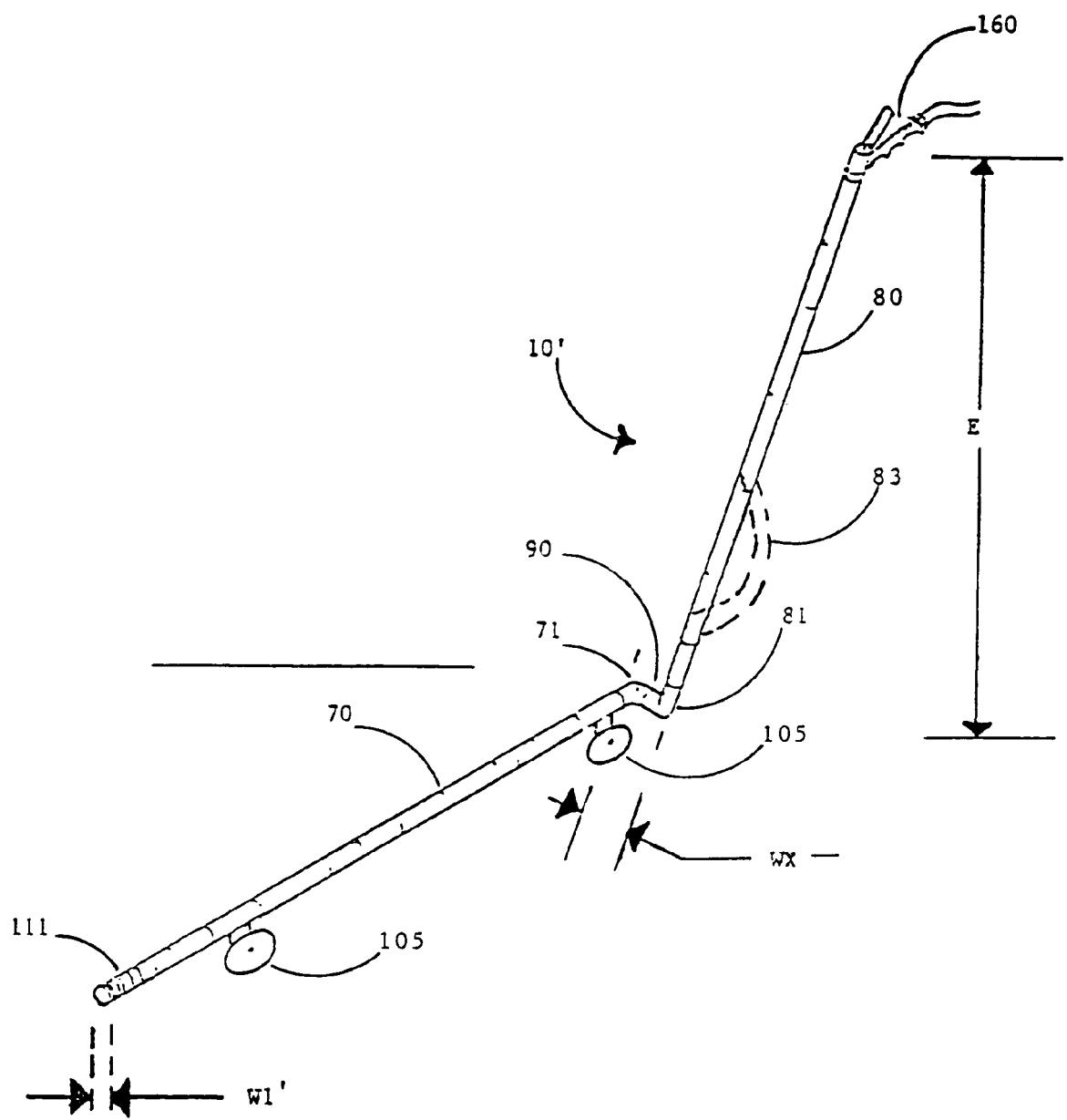
FIG. 2A is a perspective view of a stowable washer with lateral offset between base and handle members, with optional exemplary bend in the lower handle region, and with optionally offset wheel mounting, according to embodiments of the present invention.

FIG. 2A is a perspective view of a first embodiment of a stowable washer for vehicle undercarriage. In the U.S. Pat. No. 6,247,658 B1, there was no lateral (side-to-side) offset between base member 70 and handle member 80, and fluid was preferably conducted through flexible tubing 140 (see FIG. 1). By contrast, washer 10' in FIG. 2A conducts fluid through the hollow but preferably rigid bodies of handle member 80 and base member 70. As such, as shown in the embodiment of FIGS. 2A, 2B, 2D, 3A, 4E, 5A, and 5B, preferably there is a lateral (e.g., "side-to-side") offset of dimension WX between base member 70 and handle member 80. In FIG. 2A, swivel elbow joints 71, 81 permit relative rotation between members 70 and 80 to a desired maximum angle φ. If desired, a bend region 83 may be formed at the lower portion of handle member 80, as shown in phantom in FIG. 2A. Such a bent region could advantageously place the upper handle region 160 more in-line with lower member 70, and jet outlet 110 or 111, notwithstanding lateral offset WX. If desired, other or different bent regions can be formed elsewhere on member 80 and on member 70.

Thus, there is a fluid communication path from fluid input to handle region 160, through the hollow interiors of handle member 80, swivel elbow joints 81, 71, through base member 70. Fluid flowing through washer 10' then exits via outlet jet mechanism 111. Outlet jet mechanism 111 points generally upward (e.g. toward the underside of an object, not shown) and is disposed at the distal region of base member 70, which member has a transverse dimension denoted W1'.

Figure 2B:
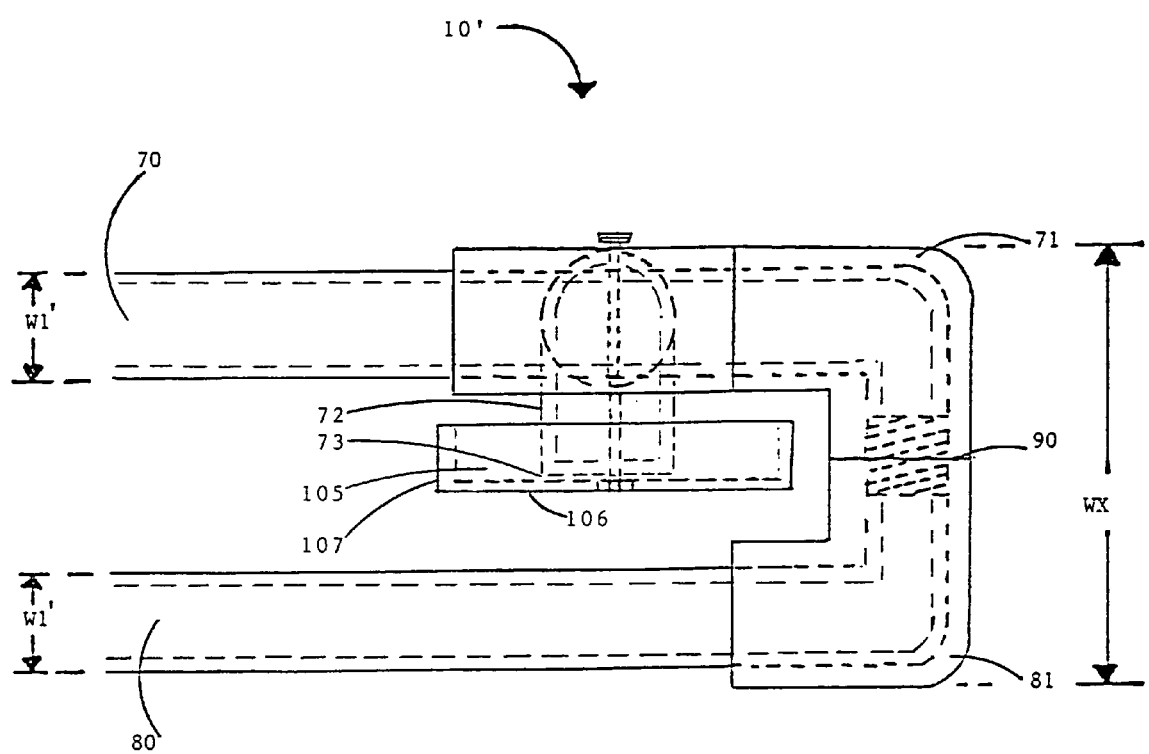
FIG. 2B is a detailed plan view of the hinged mechanism, and of an offset larger diameter wheel, used in the washer shown in FIG. 2A when deployed in a stowed position ($\phi=0°$), according to embodiments of the present invention.

FIG. 2B depicts in detail the hinged portion 90 of washer 10' in FIG. 2A, in a stowed disposition, where φ=0°. Optionally, wheels 105 are laterally offset from handle and base members 70 and 80. As such, laterally offset wheels 105 are nearer the longitudinal axis of handle member 80 than would be wheels 100 disposed directly beneath base member 70. Such offset wheel mounting accommodates device 10' users who may prefer the sensation and handling characteristics resulting from wheels near handle member 80.

Figure 2C:
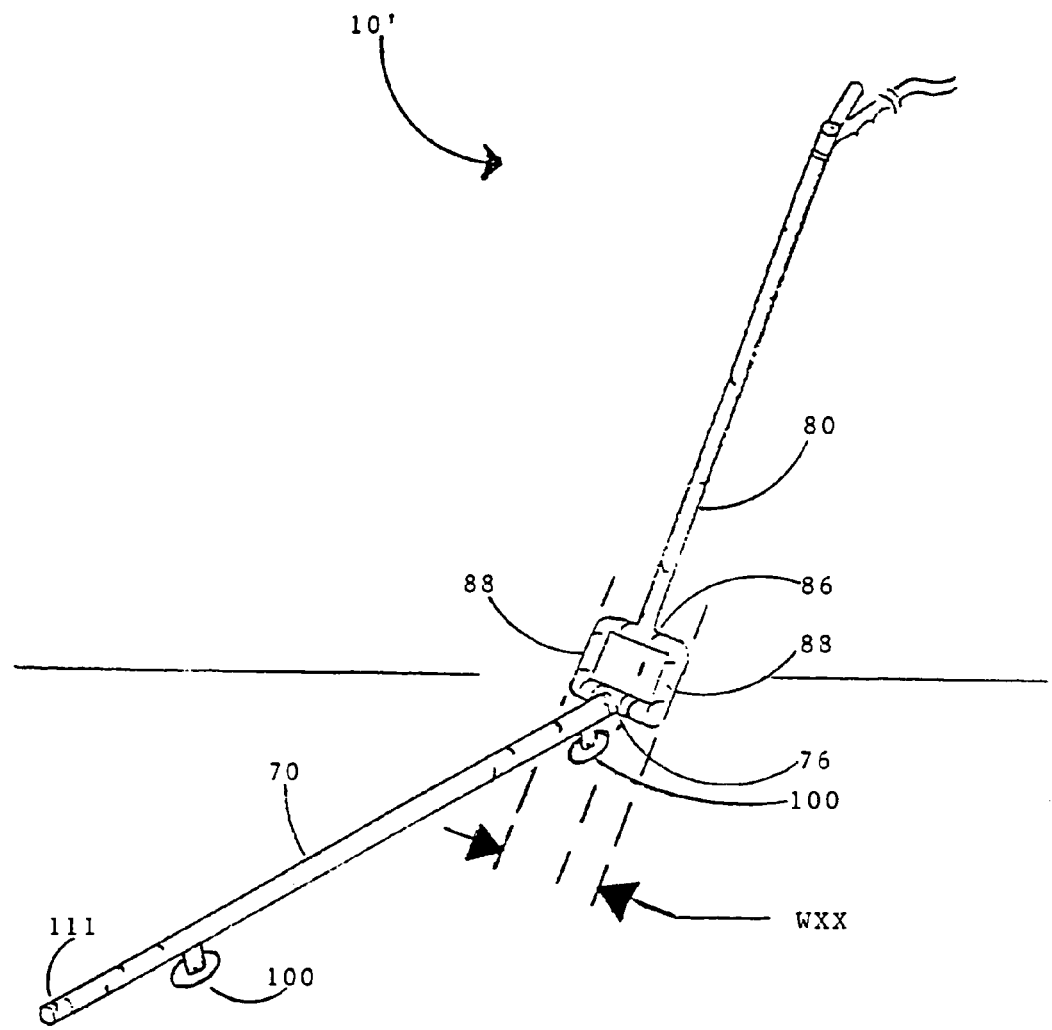
FIG. 2C is a perspective view of an in-line stowable washer with a bilaterally offset hinge mechanism, according to an embodiment of the present invention.

The embodiment of FIG. 2C is an in-line embodiment (e.g., no lateral offset between fluid conducting members 70 and 80 of washer 10'), in which hollow swivel elbow joints 76 and 86 include bilaterally offset fluid conducting elements 88 having lateral dimension WXX. If desired, in the embodiment of FIG. 2C or indeed other embodiments of washer 10' herein, wheels 100 may be mounted offset relative to the longitudinal center of base member 70. Such lateral offset of wheels 100 is depicted in FIGS. 2A, 2B, and 2D.

Figure 2D:
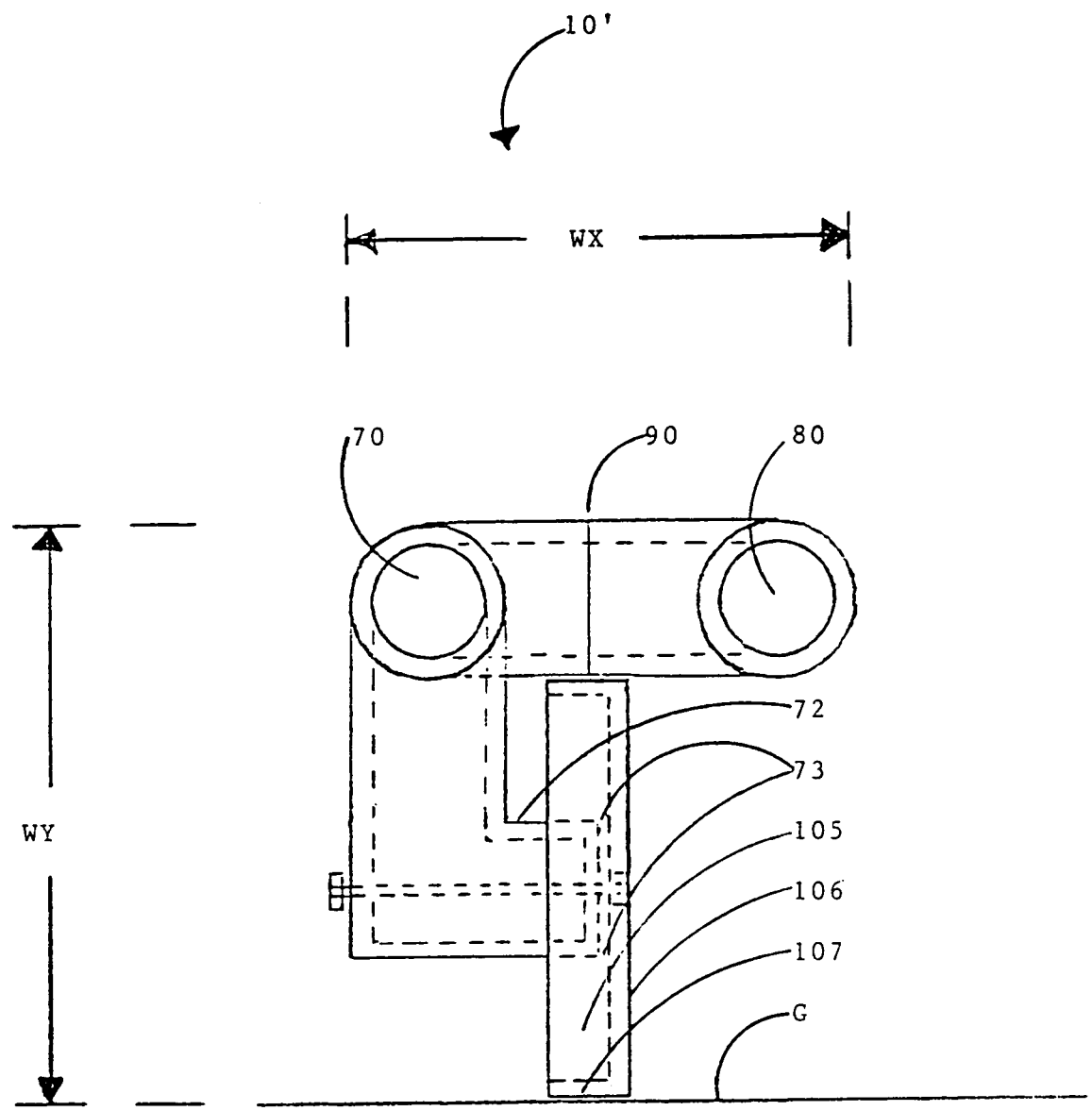
FIG. 2D is a cross-sectional view depicting an offset larger diameter wheel used in the washer of FIGS. 2A, 2B, according to an embodiment of the present invention.

FIG. 2D is a cross-sectional view of the embodiment of FIG. 2B in a stowed disposition (φ=0°). FIG. 2D better depicts offset wheel 105, which can be larger in diameter than in-line wheel 100, without necessarily increasing dimension WY from ground surface G. This configuration advantageously does not increase the exterior dimensions of device 10' while stowed. Larger wheels are inherently more maneuverable on different terrain types than smaller wheels. Providing washer 10' with larger diameter wheels can better accommodate washer use over varying ground terrain, including for example surfaces that may be rough or perhaps stone-covered, dirt, mud, as well as surfaces containing vegetation such as grass. Understandably, as device 10' (or even 10) is used, undesired ground surface debris, undercarriage gunk, ice, etc., sticking to wheels 100 may lodge between wheels 100 and the structure joining those wheels to base member 70. Thus, an offset wheel 105 as shown in 2D can provide additional shielding against such lodging of debris. More specifically, region 73, where offset wheel 105 rotates in close proximity to stationary shaft-like structure 72 on base member 70, can be shielded against infiltration by undesired substances. This is accomplished preferably with wheel face 106 and lip-like ground contact wheel surface 107. Lip-like ground contact surface 107 may be composed of a tire-like material, among other materials.

In the embodiments of washer 10' shown in FIGS. 2A and 2C, as well as other embodiments depicted herein, handle and base members 70, 80 and the various swivel elbow joints 71, 81, or 76, 86 preferably are generic inexpensive plastic pipe components, perhaps PCV material. Joints 71, 81, or 76, 86, preferably are fixedly attached to respective ends of members 70 and 80 with screw threads, adhesive, or the like. Further, these elbow joints 71, 81, or 76, 86, preferably are swivelly attached to each other, for example using threads or other connection. The result can be an inexpensive, light-weight washer 10'. Exemplary dimensions of member 70 and member 80 are: outer diameter W1' is perhaps 1" (2.54 cm), with a wall thickness of about 0.125" (3 mm). However members 70 and 80 need not have identical cross-sectional dimensions. Other materials including molded materials, metal, etc. may instead be used to fabricate stowable washer 10', according to the present invention.

Figure 3A:
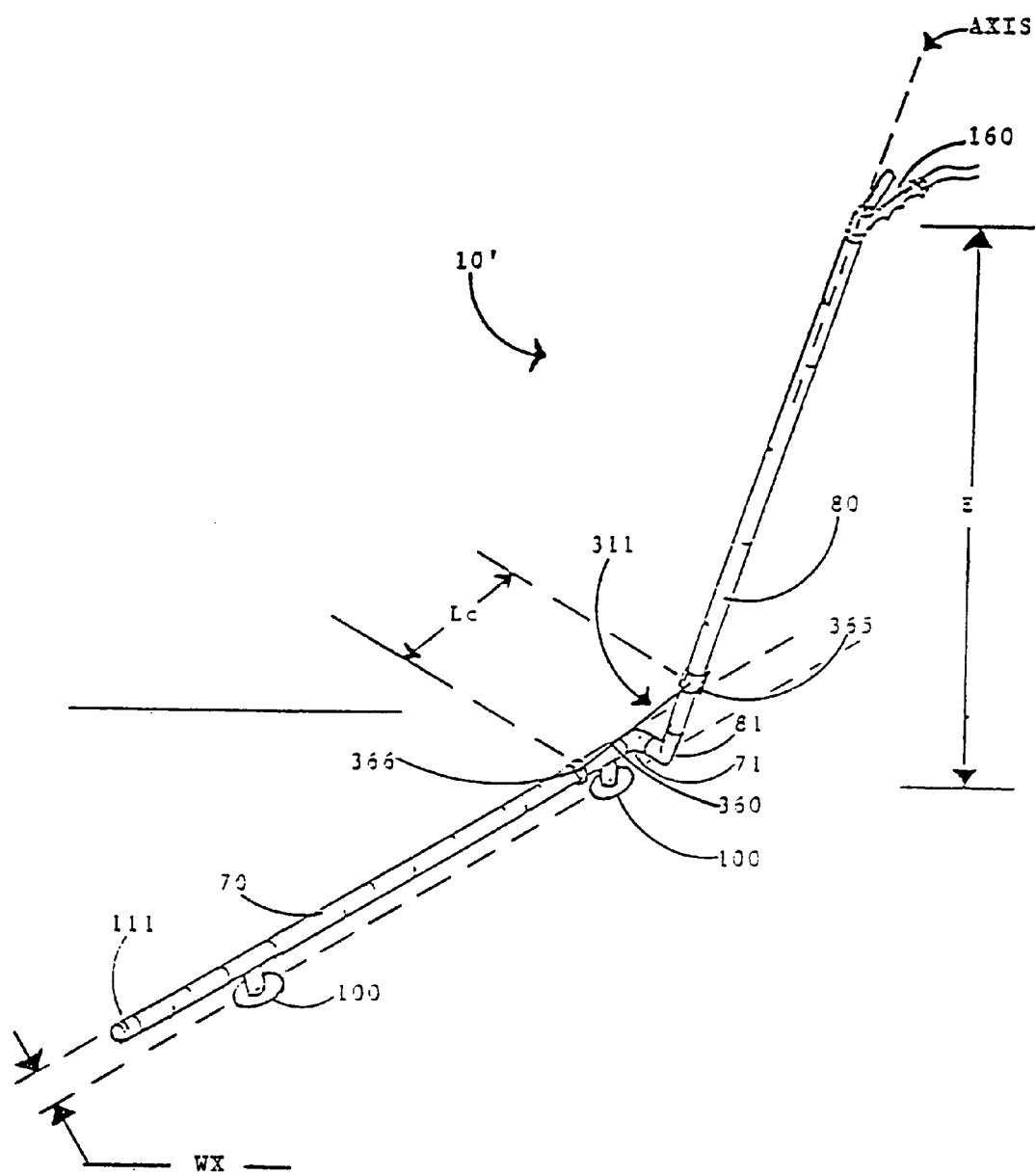
FIG. 3A is a perspective view of a stowable washer with a spoolable-cord mechanism to stop hinge motion at a desired angle $\phi$, according to an embodiment of the present invention.
Figure 3B:
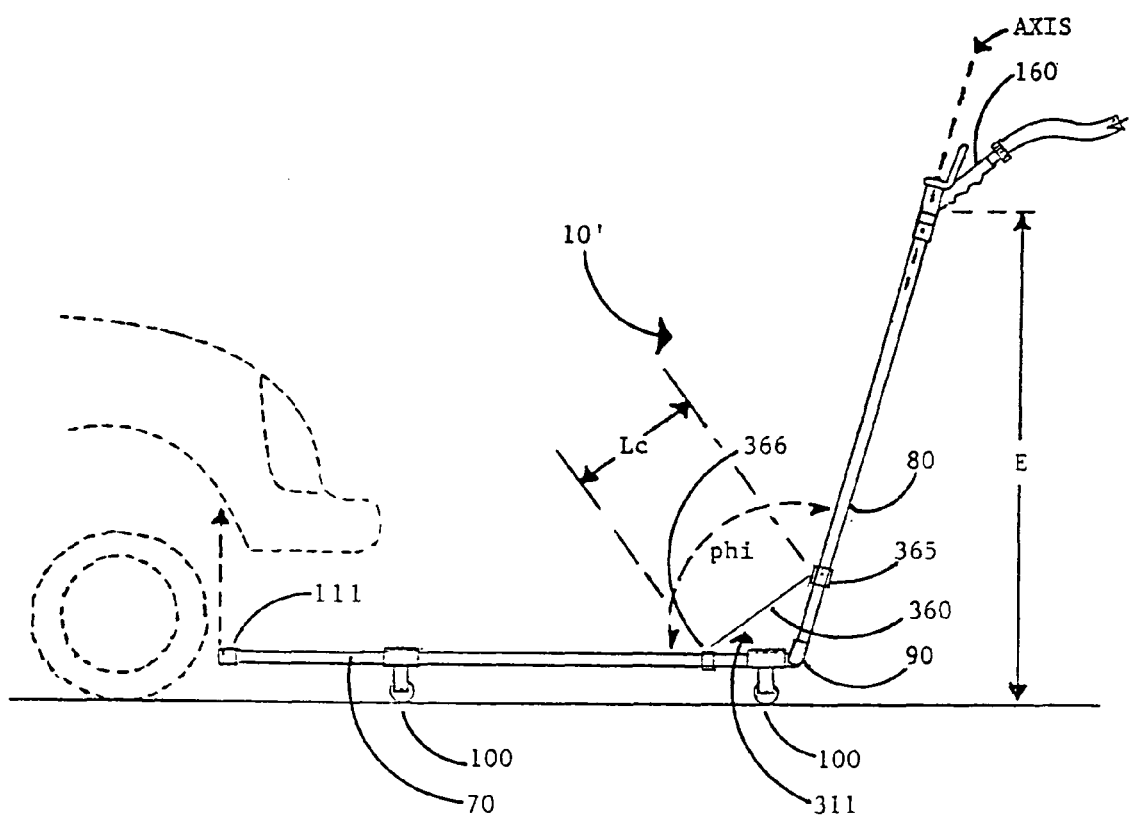
FIG. 3B is a side view of the stowable washer depicted in FIG. 3A, according to an embodiment of the present invention.
Figure 3C:
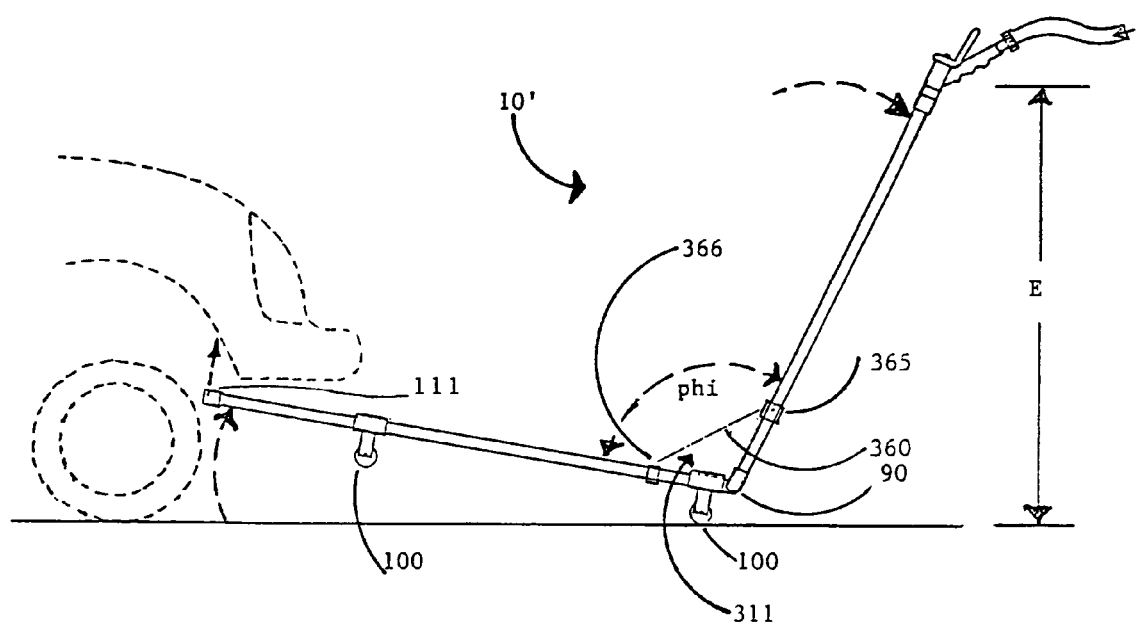
FIG. 3C is a side view of the stowable washer of FIG. 3A, deployed in a cantilevered position, according to an embodiment of the present invention.

As shown in FIG. 1, when using a stowable washer, it is desired that there be some mechanism to provide a maximum angle φ between handle and base members of the washer. For ease of illustration, the washer 10' embodiments of FIGS. 2A and 2C did not show a hinge motion stop mechanism. By contrast, washer 10' shown in FIGS. 3A-3C depicts a first embodiment of a hinge motion stop mechanism 311, a spoolable cord type mechanism that limits the maximum desired angle φ between base member 70 and handle 80. FIG. 3C also depicts device 10' in a cantilevered disposition, which results when a user (not shown) exerts a down and backward thrust upon the upper portion of handle member 80 to more advantageously eject fluid into otherwise hard to access undercarriage cavity regions.

Referring now to FIGS. 3A-3C, hinge motion stop mechanism 311 preferably includes a length of flexible cord or cable 360 that preferably is fixedly attached or attachable at one cord end to base member 70, for example by securing to attachment member 366 that is fixedly secured to base member 70. The length of cord 360 typically is greater than the exposed length Lc that is visible in FIGS. 3A-3C. The remainder of the cord is wound or spooled within a preferably castellation-shaped spool retaining reservoir member 365. Reservoir member 365 preferably is disposed coaxial with and can rotate about a longitudinal axis (AXIS) of handle member 80. As used herein, "cord" is a flexible material such as cotton rope, nylon cord, small sized chain, flexible wire, and the like. Cord 360 preferably is generic nylon cord with a diameter of about 1/16". Other dimensions and types of cord or cable may of course be used.

As reservoir member 365 is user rotated to expose a greater length of cord, Lc and angle φ increase. Alternatively, as user-rotation spools in already exposed cord, length Lc and angle φ decrease. In this simple fashion, user adjustment of the maximum desired angle φ is readily achieved by thus adjusting the exposed cord length Lc.

As best seen in FIG. 3B, as angle φ increases, the vertical elevation E between handle region 160 and the ground (upon which wheels 100 rest) decreases. Thus, a short statured user of device 10' might wish to unwind or unspool a greater length of cord from within reservoir 365 to achieve a larger exposed length Lc defining a greater maximum angle φ, to achieve a more comfortable, and closer to the ground, handle 160 elevation E. On the other hand, a taller user of device 10' may wish to rotate reservoir 365 to spool in more cord length, to shorten Lc, reduce angle φ, and increase height E. In this fashion, applicant's cable spooling reservoir mechanism can help make stowable washer 10' accommodate users of varying height. Thus, applicant's mechanism to adjust angle φ also provides the user of device 10' with the means to adjust a suitable elevation distance E. Mechanisms for changing elevation E, other than by choosing angle φ, may of course be employed.

In adjusting the effective length Lc, a tall user might first pull a length of cord 360 from the castellation slot in reservoir 365, through which the cord extends. Next the user would rotate member 365 clockwise (in the figures) about member 80 as required to spool additional retained cord into the channel space 330 within the reservoir. Upon exposing the desired length Lc of cord (as evidenced by the resultant decrease in angle φ and increase in height E), then the cord would be slid through the nearest user-selected slot 320 and into that slot's opening 325.

In contrast with location of the stopping mechanism in prior art FIG. 1, location of mechanism 311 is remote from the junction of members 70 and 80, which simplifies user adjustment of angle φ. It will be appreciated that hinge motion stop mechanism 311 advantageously reduces the magnitude of forces required to stop hinge motion at desired angle φ. This is achieved by distributing such stopping forces through much of the length of longitudinal-shaped members 70 and 80, rather than subjecting the hinge or pivot point 90 (at the junction of members 70 and 80) to the full hinge stopping force. The distribution of forces provided by the present invention results in a more robust unit 10'.

Figure 4A:
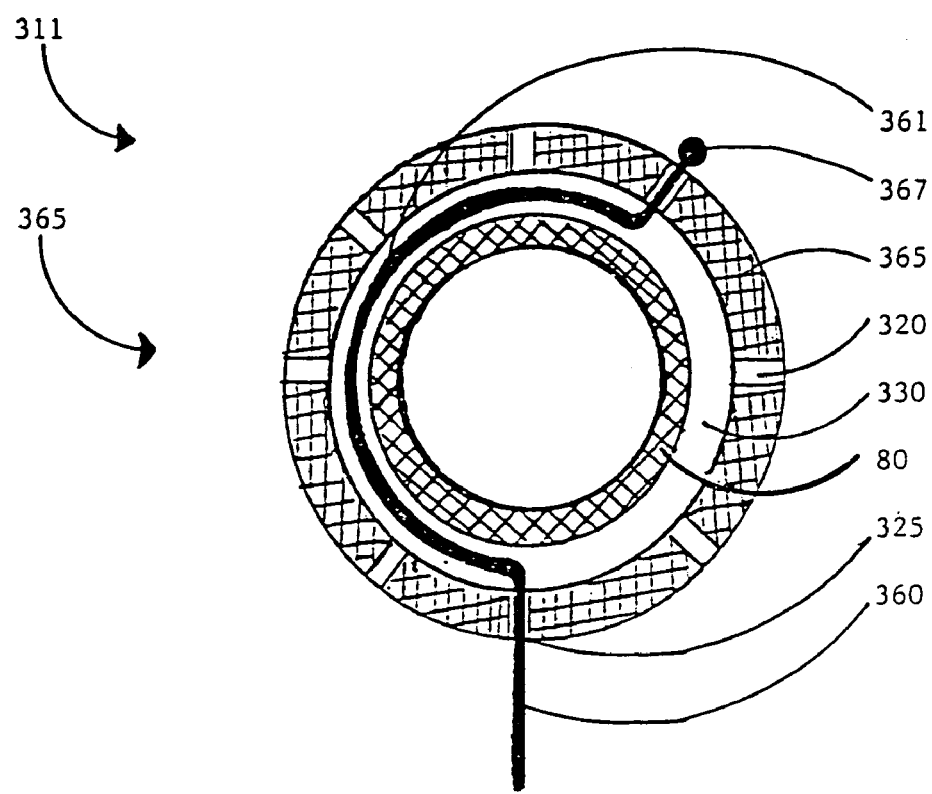
FIGS. 4A, 4B are respective plan and side views of a rotatable castellated portion of a cord reservoir for a first embodiment of a stop hinge mechanism, according to the present invention.
Figure 4B:
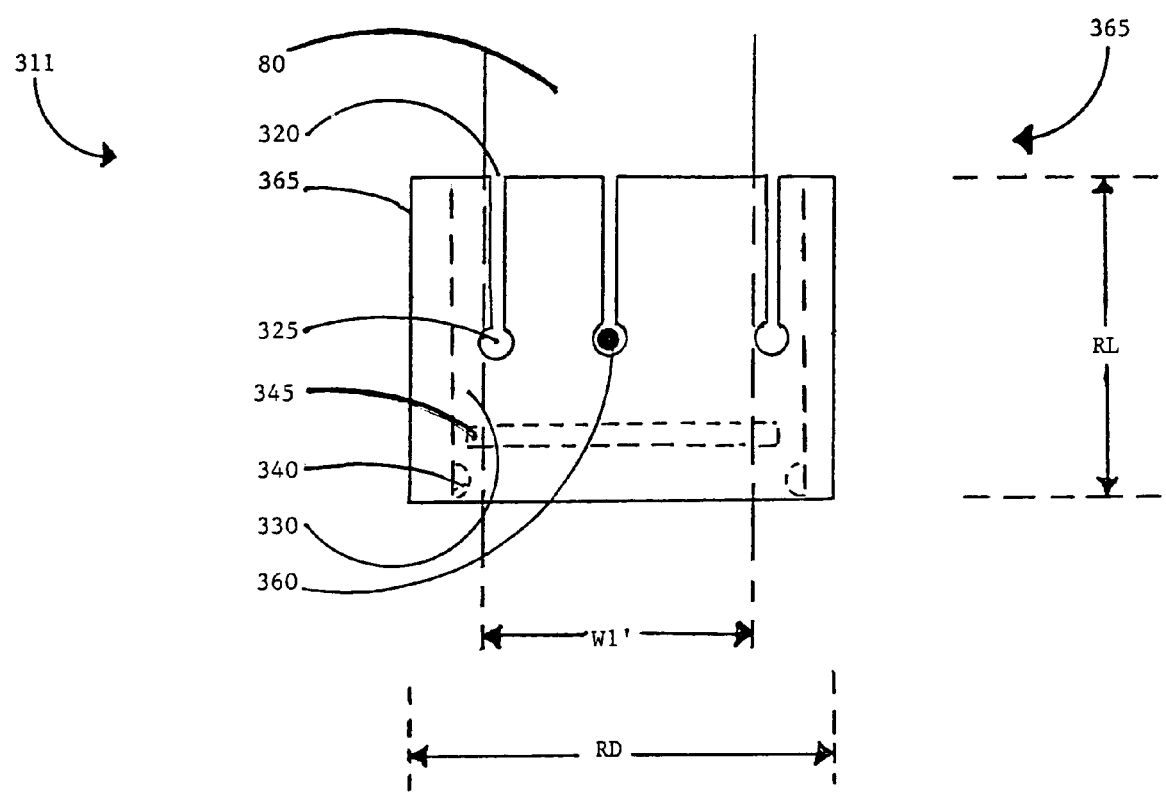

FIGS. 4A-4D depict in further detail the rotatable cord retaining reservoir member 365 of stop hinge motion mechanism 311. Referring to FIG. 4A, excess length of cord 360 is spooled into and retained within spoolable reservoir mechanism 365, as length 361. (For ease of illustration, FIG. 4A depicts but a small length of cord retained within rotatable reservoir 365, a length about half the circumference of member 80, about which reservoir 365 rotates.) As shown in FIGS. 4A and 4B, the upper perimeter of member 365 defines a plurality of slots 320, each of which preferably terminates in an opening 325. As such, the upper perimeter of member 365 has somewhat of a castellation shape and the slots, or openings, are somewhat keyhole shaped. Slots 320 have a width allowing the width of cord 360 to frictionally but tightly pass, whereas the transverse dimension of opening 325 preferably freely allows the width of cord 360 to pass. This configuration provides resistance and friction that hinders unintended movement of cord 360 out of a selected slot 320, while allowing the cord to move freely through the associated slot opening 325. Within reservoir 365, the free end of cord 360 terminates and is preferably fixedly attached to member 365, for example by passing through an opening 325 and being knotted at 367.

As shown in FIG. 4A, a channel space 330 is formed between the outer diameter of member 80 and the inner diameter of member 365. In the configuration shown, member 365 is mounted coaxially about member 80 and can freely rotate thereabout. As shown in FIG. 4B, rotatable member 365 can be constrained from upwards and downwards movement along member 80. Preferably the lower inner wall of rotatable member 365 includes a lip 340. A spacer-disk 345 or the like is preferably fixedly attached to member 80 and cooperates with lip 340 to prevent rotatable member 365 from sliding too far upward along the length of member 80. Preferably, spacer-disk 345 or the like cooperates with retained cord 361 to prevent rotatable member 365 from sliding too far downward along the length of member 80. Exemplary dimensions for the embodiment of FIG. 4B are RD and RL each about 1.5" (1.27 cm), when using generic plastic plumbing pipe material.

Figure 4C:
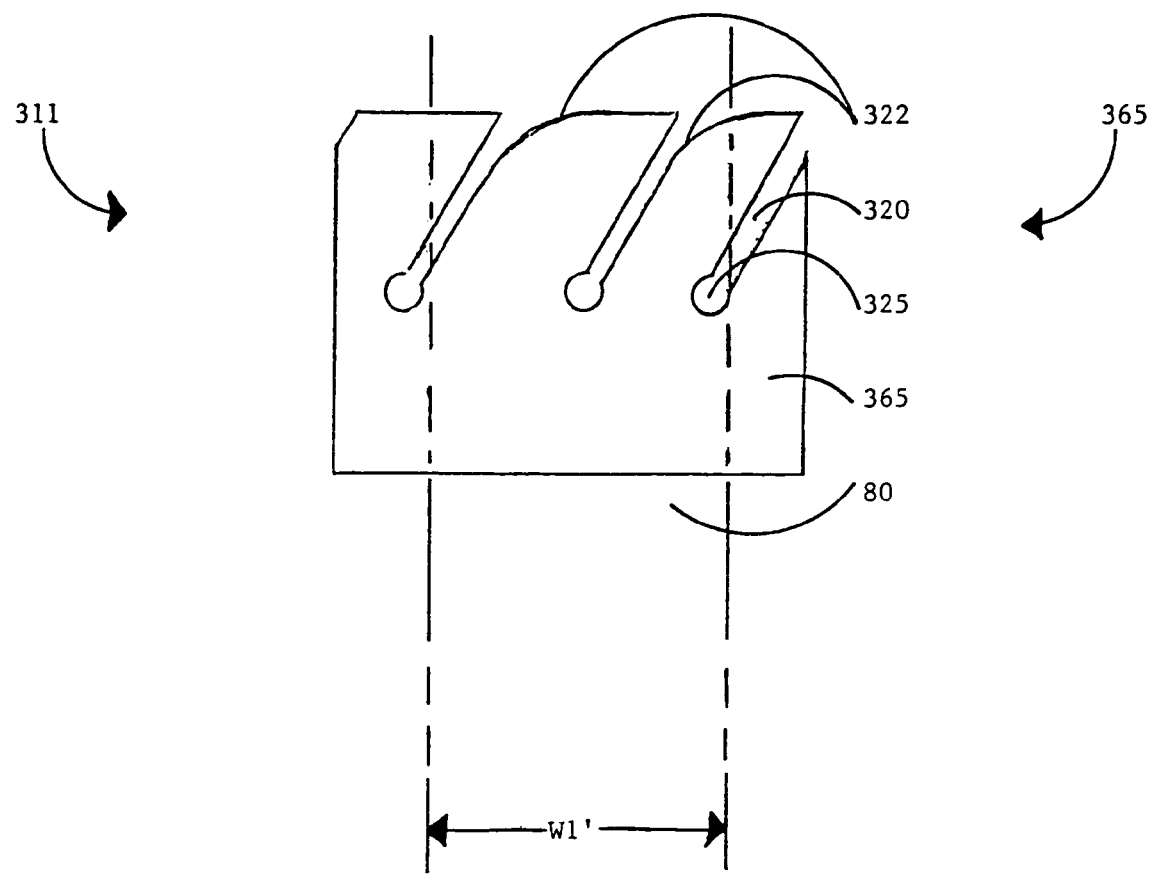
FIGS. 4C, 4D are side views of alternative embodiments of a rotatable castellated portion of a cord reservoir stop hinge mechanism, according to the present invention.
Figure 4D:
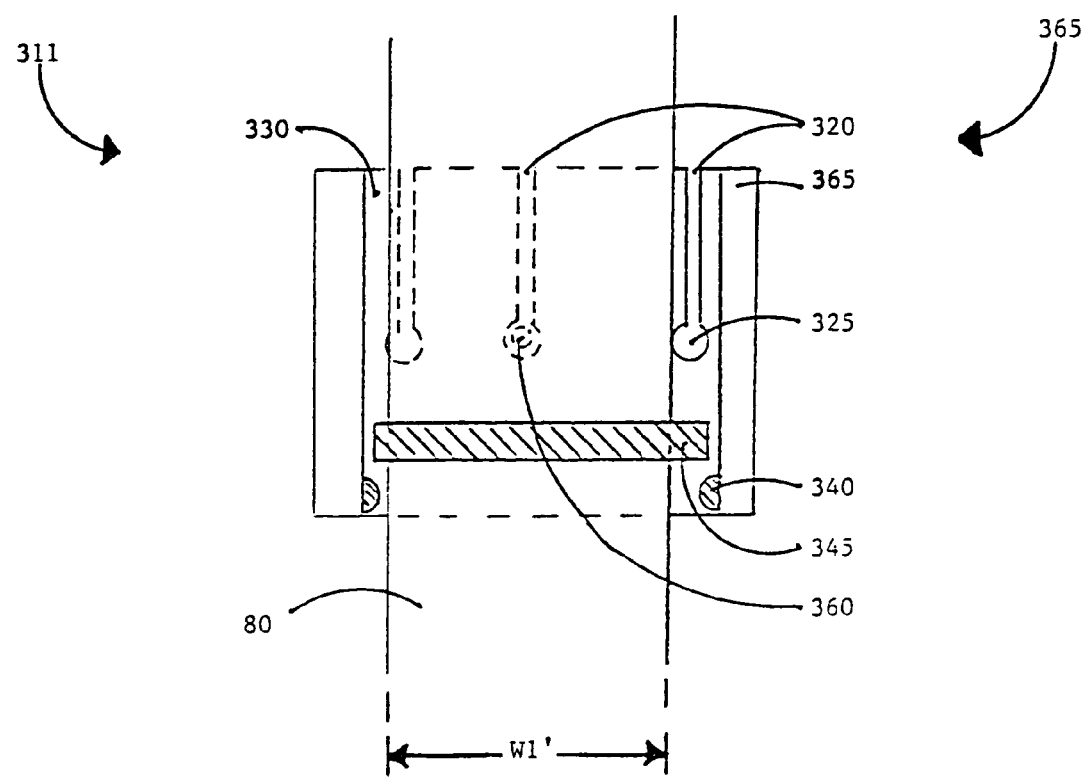

As shown in FIG. 4C, orientation of slots 320 need not be perpendicular to the upper perimeter of reservoir 365 where the slots open, but may be formed at another preferred angle. Further, slots 320 need not necessarily be spaced-apart equally from one another, nor need each slot necessarily have the same shape as other slots.

As further shown in FIG. 4C, one or both cord-entrance edges of the slots may include a curved region 322 to ease insertion of cord 360 into the associated slot. This can be advantageous when the user of washer 10' is inserting cord 360 into a slot, while rotating reservoir 365 is under a rotational counter-clockwise force. Such counter-clockwise force may result from tensile force being applied upon cord 360 while washer 10' is open at or near angle φ. Further, rounded, or non-sharp, non-abrasive, edges along the perimeter of slots 320, 322 and opening 325 can reduce cord abrasion. If desired, conventional lubricant could be applied to contacting surfaces to further reduce cord abrasion.

It will be appreciated that increasing the number of slots within member 365, will allow adjustments in the exposed cord 360 length Lc to be changed in smaller increments. In practice, eight slots were found to be adequate, and a total end-to-end length of cord 325 of about 1' was found to suffice for practical adjustment purposes.

Figure 4E:
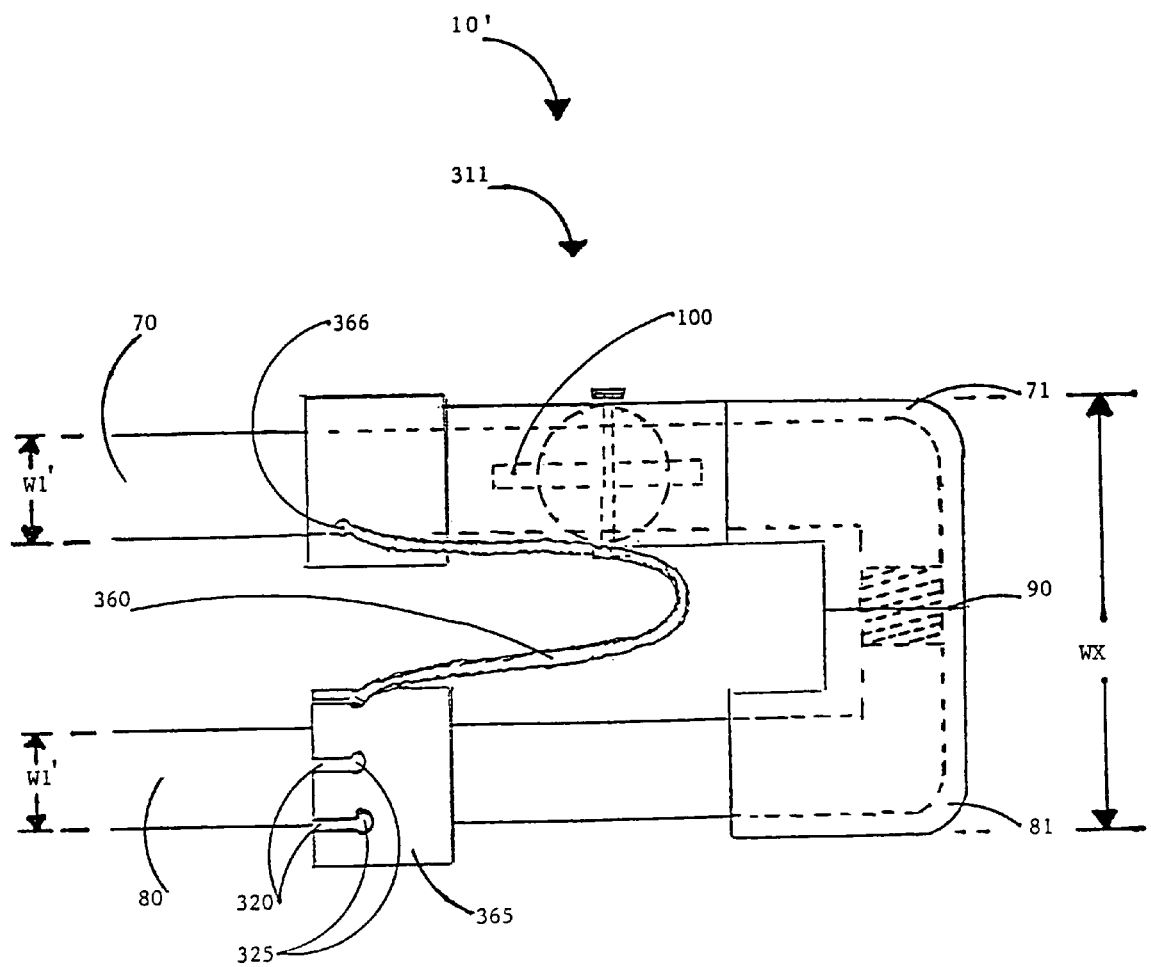
FIG. 4E is a plan view of the cord reservoir stop hinge mechanism of FIGS. 4A-4D, depicting washer 10' deployed in a stowed ($\phi=0°$) position, according to an embodiment of the present invention.

FIG. 4E shows the cord adjusting mechanism portion 311 of washer 10' in a folded, stowable, disposition, with a short length of cable 366 exposed between members 70 and 80.

It will be appreciated that while FIG. 4E (as well as FIGS. 3A-4D) depicts rotatable reservoir 365 disposed co-axially about member 80, the rotatable reservoir may be disposed otherwise. For example, rotatable reservoir 365 may be mounted perpendicular to the AXIS of member 80 in the position of and at the mounting angle of swivel 410 that is shown in FIG. 5B. Indeed, if desired, one could mount rotatable reservoir 365 about base member 70, and attach free end 366 of cord 360 to handle member 80. However, mounting rotatable reservoir 365 on handle member 80 has the advantage of being more conveniently located for user-adjustment. While the embodiments shown depict the ends of cord 360 secured more or less equidistant from the hinge point 90 of washer 10', it is understood that other anchoring configurations can be used.

Further, it should be appreciated that cord mechanism 365 may be used to control the length of flexible cord for devices other than a stowable washer 10', especially in applications where failure of the device would be hazardous. Thus, mechanism 365 may be used to maintain a desired length of cord, cable, wire, chain, and other cordage under tensile force, where cord length should be reliably, accurately and simply controlled. Other such applications include, without limitation cords used to anchor a boat, power lines under installation, tent anchor lines, winch cable, sail lines on boats, fishing lines on reels, high-rise building window washing platform lines, variable position door stops, redundant non-friction emergency safety brakes superimposed upon a variety of conventional ratcheted line-length control devices. Cord mechanism 365 may also find application to replace vulnerable ratchet mechanisms as in vehicular emergency brake controls. Mechanism 365 is inherently less complicated, less expensive, and more reliable than conventional ratchet-type mechanisms.

Figure 5A:
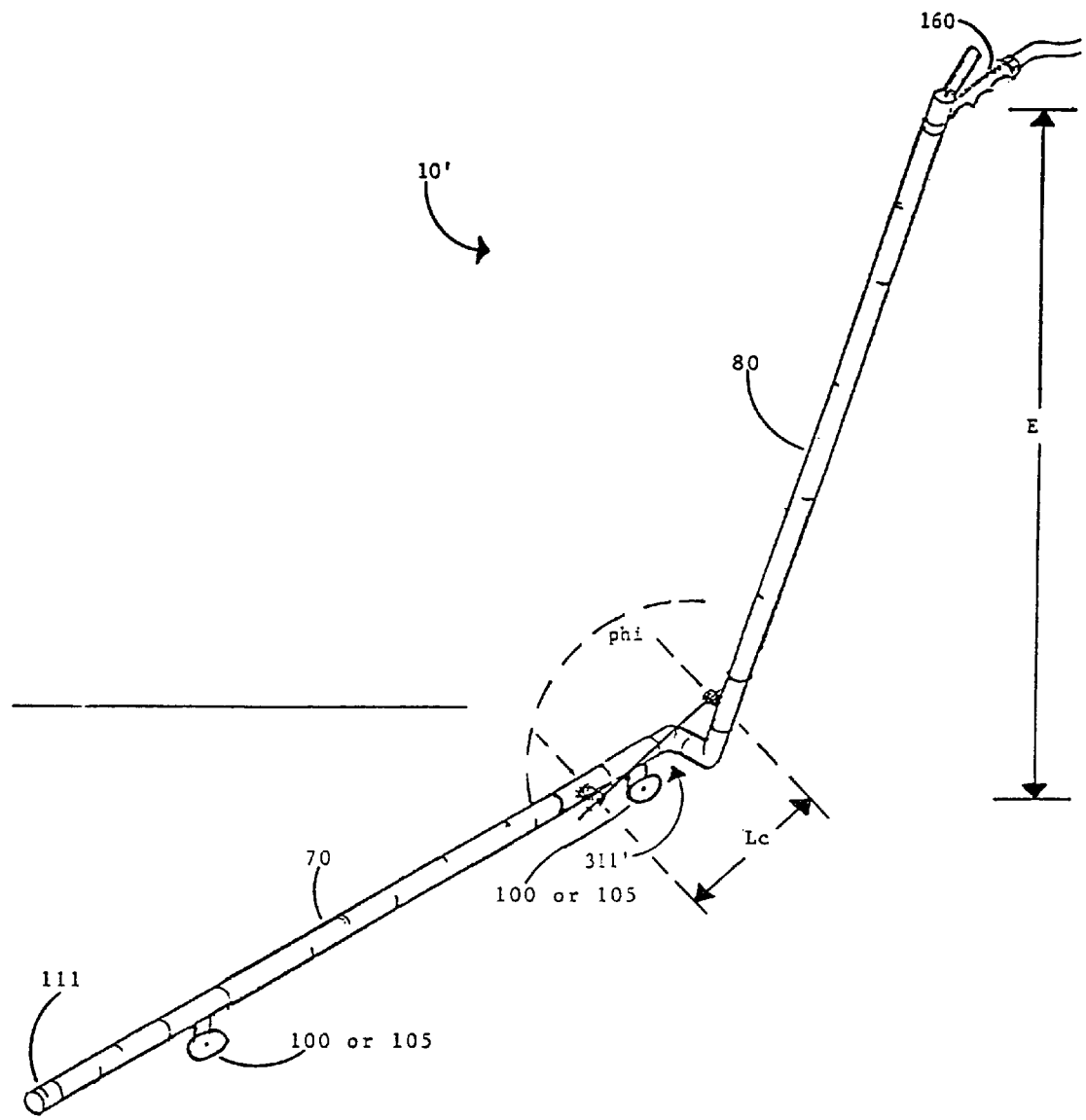
FIG. 5A is a perspective view of a washer provided with a second embodiment of a mechanism to stop hinge motion at a desired angle φ, according to the present invention.
Figure 5B:
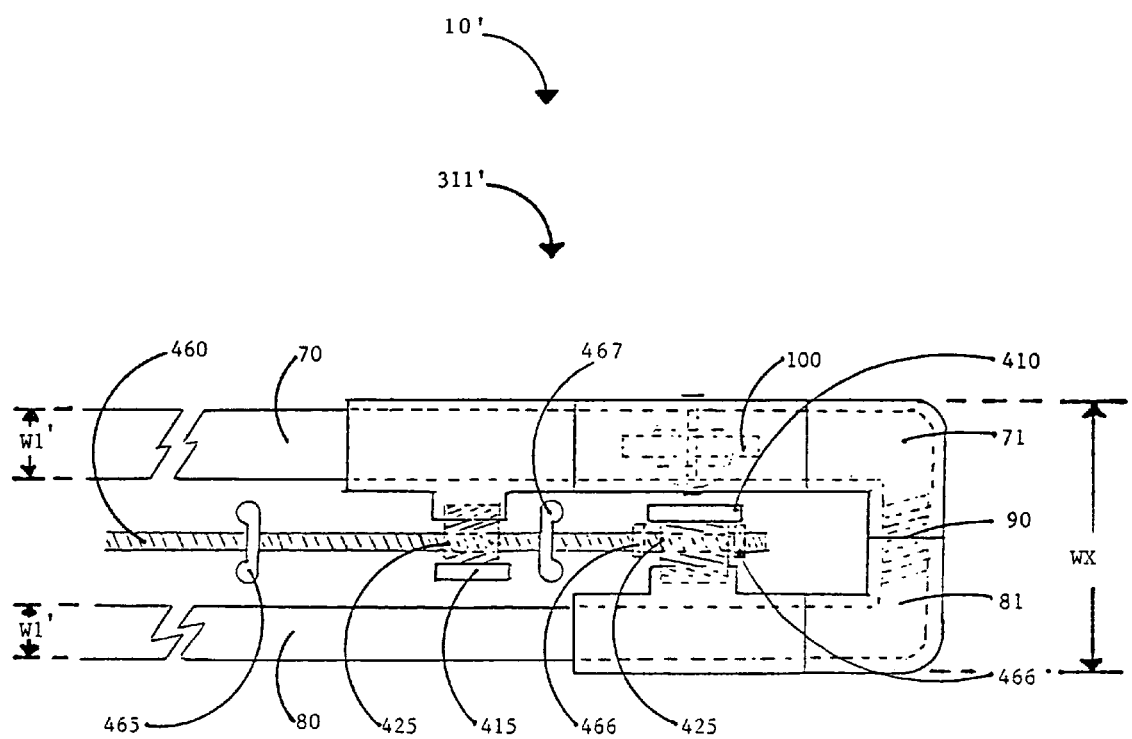
FIG. 5B is a plan view depicting the stop hinge mechanism of FIG. 5A in a stowed disposition (φ=0°), according to the present invention.

Turning now to the embodiments of FIGS. 5A and 5B, washer 10' is now provided with a substantially rigid (as contrasted to a flexible) mechanism 311' to vary angle $\phi$, and thus elevation E. In these embodiments, mechanism 311' includes a rigid rod-shaped element 460 to adjust maximum angle $\phi$ and to apply a halting force away from the hinge point region 90 of longitudinal members 70 and 80. Whereas the embodiment of FIG. 3A varied $\phi$ by rotatably adjusting the effective length Lc of a flexible cord, in the embodiment of FIGS. 5A and 5B, angle $\phi$ (and thus dimension E) is varied by adjusting the effective length Lc of a rigid rod.

As best seen in FIG. 5B, some or all of the length of rod-like element 460 engages mating threads of thumbscrew 465. Repositioning thumbscrew 465 results in a change in angle $\phi$, and therefore a corresponding change in elevation E of handle 160, as depicted in FIG. 5A. Rod like element 460 is preferably a stiff or rigid material, such as metal, plastic, nylon, etc. A non-threaded rod-like element 460 may instead be used. For example, a pin-like stopping insert or clamp-like sliding mechanism, positionable along the length of the rod-shaped element, preferably at one of a plurality of notches or openings, would achieve the described function of thumbscrew 465 in the threaded configuration. FIG. 5B depicts rod 460 passing through holes 425 and fixedly attached to swivel 410 using nut-like devices 466. Rod 460 slides through swivel 415, and as members 70 and 80 are opened, angle $\phi$ increases. When thumbscrew 465 contacts swivel 415, the opening motion is halted and angle $\phi$ cannot increase further.

FIG. 5B shows thumbscrew 467 located between swivels 410 and 415. After thumbscrew 465 contacts swivel 415, thereby stopping angle $\phi$ from increasing beyond the chosen maximum, thumbscrew 467 may then be positioned near to or in contact with swivel 415. The result is restriction of angle $\phi$ within a chosen minimum and maximum range, defined between longitudinal members 70 and 80. It will be appreciated that such restriction of angle $\phi$ movement comprises a lockable hinge, which provides user of washer 10' with additional preferences.

The various embodiments of washer 10' that have been described herein include a preferably user-replaceable outlet jet mechanism 111. This aspect of the present invention provides the user of washer 10' with a choice of orifices, to better accommodate varying fluid characteristics and tasks. Interchangeability permits user selection not only of a desired outlet jet mechanism, but also outputs for a given mechanism. Thus, an appropriate outlet jet can be selected to control varying spray patterns, taking into account user preferences and varying fluid characteristics including fluid viscosity, fluid flow pressure, fluid temperature, fluid flow rate, ingredients in the fluid, and so forth. For example if the fluid is water, perhaps a small sized orifice will suffice, whereas if the fluid includes a viscous cleaning component, a larger size orifice may be required, as well as possibly higher fluid pressure.

Figure 6:
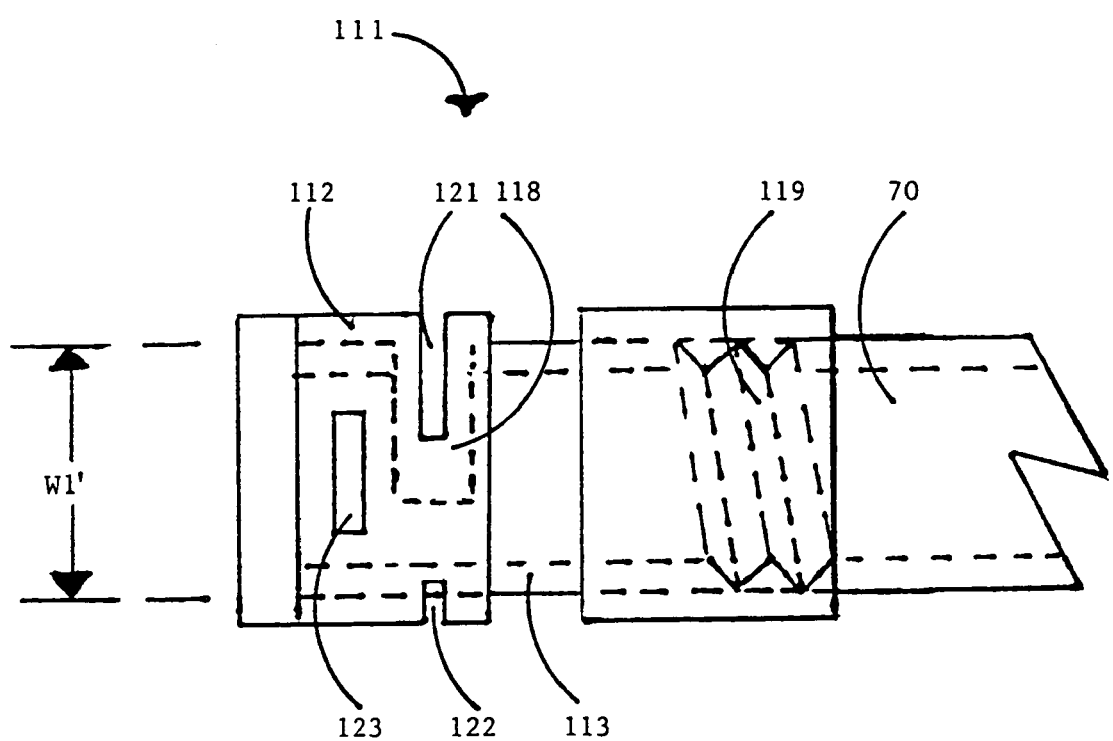
FIG. 6 is a sideview of an exemplary embodiment of a fluid outlet jet mechanism for a stowable washer, according to an embodiment of the present invention.

As best seen in FIG. 6, outlet jet mechanism 111 preferably is removably attached to the distal end of base member 70, for example with a threaded connection 119, although other attachment mechanisms could be used. Preferably mechanism 111 is interchangeable such that various outlet jet mechanisms may be attached to provide the user with a desired spray characteristic from orifice 121, for the fluid used with washer device 10', although a continuously variable, or threaded, outlet jet mechanism can be used. As shown in FIG. 6, a fluid passage channel 118 is defined generally under exit orifice 121, from which fluid is ejected towards a vehicle undercarriage or other object subjected to the ejected fluid.

Preferably, outlet jet mechanism 111 includes a switch mechanism 112 that is rotatable to provide a user-selection of orifices, such as 121, 122. For example, orifice 122 may be selected by the user rotating switch 112 to move orifice 122 into the uppermost, or fluid ejection, position. In addition to rotating, switch 112 preferably can slide axially along shaft 113 so as to provide access to additional orifice selections. For example, orifice 123 may be selected by sliding switch mechanism 112 along shaft 113, and then rotating switch mechanism 112 until orifice 123 is in the uppermost, or fluid ejection, position. Preferably, a conventional detent retains switch mechanism 112 at a user-selected position. It will be appreciated that the ability to thus modify the nature and characteristic of the fluid flow emitted from outlet jet mechanism 111 enhances the utility of device 10'.

While various embodiments of the present invention have been described with respect to use with a washer such as described in applicant's U.S. Pat. No. 6,247,658 B1, it will be appreciated that the present invention may be used with other devices as well. Modifications and variations may be made to the disclosed embodiments without departing from the subject and spirit of the invention as defined by the following claims.

What is claimed is:

1. A stowable device to subject the underside of a vehicle to a pressurized flow of fluid coupleable to a handle portion of the device, comprising:

a hollow base member having a first distal end and a second distal end;

a fluid jet disposed adjacent said first distal end of said base member and defining an outlet orifice through which said fluid may be forced;

a hollow handle member having a first distal end, and having a second distal end rotatably coupled to said second distal end of said hollow base member to define a user-adjustable angle $\phi$ therebetween, said hollow handle member defining a length L between said first distal end and said second distal end of said hollow handle member, said hollow base member and said hollow handle member being in fluid communication with each other such that a source of pressurized fluid coupled to said first distal end of said hollow handle member causes said fluid to exit said fluid jet;

a spoolable reservoir attached to said hollow handle member; and a cord having a first end attached to said spoolable reservoir, a second end secured to an attachment on said hollow base member, and a total cord length therebetween equal to a first length plus a second length, said first length of said cord residing within said spoolable reservoir and said second length of said cord extending from said spoolable reservoir to said attachment on said hollow base member;

said second length of cord defining a user-variable longest side of a triangle whose other sides are a fixed length of said hollow member from said second distal end of said hollow member to location of said spoolable reservoir on said hollow member, and a fixed length of said hollow base member from said second distal end of said hollow base member to attachment of said second end of said cord to said hollow base member;

wherein rotation of said spoolable reservoir changes said second length of said triangle to set a maximum value of said angle $\phi>90°$ to set height E of said first distal end of said hollow handle member relative to said second distal end of said hollow handle member, where E is proportional to $L-\sin(\phi)$.

2. The stowable device of claim 1, wherein said spoolable reservoir is rotatable relative to a longitudinal axis of said hollow handle member.

3. The stowable device of claim 1, wherein said spoolable reservoir has at least one characteristic selected from a group consisting of (a) said spoolable reservoir has a rotation axis parallel to a longitudinal axis of said hollow handle member, (b) said spoolable reservoir is mounted on said hollow handle member for coaxial rotation thereabout, and (c) said spoolable reservoir includes a mechanism to lockably retain said first length of said cord within said spoolable reservoir.

4. The stowable device of claim 1, wherein said spoolable reservoir includes a perimeter surface defining at least one cord-retaining sized castellation;

wherein said second length of said cord exits said spoolable reservoir through a one said castellation.

5. The stowable device of claim 4, wherein one said castellation defines a circular-shaped distal region sized to pass a diameter of said cord.

6. The stowable device of claim 1, wherein said cord is a spoolable material selected from a group consisting of nylon cord, cotton cord, plastic cord, chain, and wire.

7. The stowable device of claim 1, wherein said fluid jet has at least one characteristic selected from a group consisting of (a) said fluid jet is user-removable, (b) said fluid jot is user-adjustable to vary size of said outlet orifice, (c) said fluid jet is user-adjustable to vary exit shape of said outlet orifice, (d) said fluid jet includes a rotatable switch enabling selection of a desired outlet orifice, and (e) said fluid jet includes a slide switch enabling selection of a desired outlet orifice.

8. The stowable device of claim 1, wherein said second distal end of said hollow handle member and said second distal end of said hollow base member are flexibly joined to each other with a lateral (side-to-side) offset.

9. The stowable device of claim 8, wherein a lower region of said hollow handle member is defined with a bend such that said first distal end of said hollow handle member has substantially zero lateral offset relative to a longitudinal axis of said base member.

10. The stowable device of claim 1, further including at least one wheel attached to said hollow base member in a manner selected from a group consisting of (a) said wheel is attached without a lateral (side-to-side) offset relative to a longitudinal axis of said hollow base member, (b) said wheel is attached with a lateral (side-to-side) offset relative to a longitudinal axis of said hollow base member, and (c) attachment of said wheel includes means for protecting said wheel from intrusion by debris.

11. A stowable device to subject the underside of a vehicle to a pressurized flow of fluid coupleable to a handle portion of the device, comprising:

a hollow base member having a first distal end and a second distal end;

a fluid jet disposed adjacent said first distal end of said hollow base member and defining an outlet orifice through which said fluid may be forced;

a hollow handle member having a first distal end, and having a second distal end, and a length L therebetween, said second distal end rotatably coupled to said second distal end of said hollow base member to define an adjustable angle $\phi$ therebetween, said hollow base member and said hollow handle member being in fluid communication with each other such that a source of pressurized fluid coupled to said second distal end of said hollow handle member causes said fluid to exit said fluid jet;

means for adjusting at least said adjustable angle $\phi$, said means for adjusting disposed between a location intermediate said first distal end and said second distal end of said hollow base member to define a first fixed length, and between a location intermediate said first distal end and said second distal end of said hollow handle member to define a second fixed length, said means for adjusting defining a physical triangle having a fixed first side comprising said first fixed length, having a fixed second side comprising said second fixed length, and having a longest flexible side, opposite said angle $\phi$, defining a user-adjustable length third side;

wherein adjustment of said means for adjusting sets a maximum magnitude of said adjustable angle $\phi>90°$ and distributes forces stably between said hollow base member and said hollow handle member.

12. The stowable device of claim 11, wherein said means for adjusting includes a mechanism to lockably fix an adjusted magnitude of said angle $\phi$.

13. The stowable device of claim 11, wherein said means for adjusting includes as said longest adjustable side an adjustable length of cord, an effective length of said cord altering magnitude of said angle $\phi$.

14. The stowable device of claim 11, wherein said means for adjusting includes a spoolable reservoir containing a length of cord, an effective length of said cord defining said longest adjustable side and altering magnitude of said angle $\phi$.

15. The stowable device of claim 14, wherein said spoolable reservoir has at least one characteristic selected from a group consisting of (a) said spoolable reservoir is rotatable so as to alter said effective length of said cord, (b) said spoolable reservoir is rotatable relative to a longitudinal axis of said hollow handle member, (c) said spoolable reservoir is rotatable relative to a longitudinal axis of said hollow base member, (d) said spoolable reservoir has a rotation axis parallel to a longitudinal axis of said hollow handle member, (e) said spoolable reservoir has a rotation axis parallel to a longitudinal axis of said hollow base member, (f) said spoolable reservoir is mounted on said hollow handle member for coaxial rotation thereabout, and (g) said spoolable reservoir is mounted on said hollow base member for coaxial rotation thereabout.

16. The stowable device of claim 14, wherein said spoolable reservoir includes a perimeter surface defining at least one cord-retaining sized castellation;

wherein an adjusted effective length of said cord exits said spoolable reservoir through one said castellation.

17. The stowable device of claim 11, wherein said cord is a spoolable material selected from a group consisting of nylon cord, cotton cord, plastic cord, chain, and wire.

18. The stowable device of claim 11, wherein said fluid jet has at least one characteristic selected from a group consisting of (a) said fluid jet is user-removable, (b) said fluid jet is user-adjustable to vary size of said outlet orifice, (c) said fluid Jet is user-adjustable to vary exit shape of said outlet orifice, (d) said fluid jet includes a rotatable switch enabling selection of a desired outlet orifice, and (e) said fluid jet includes a slide switch enabling selection of a desired outlet orifice.

19. The stowable device of claim 11, wherein configuration of said stowable device has at least one characteristic selected from a group consisting of (a) said second distal end of said hollow handle member and said second distal end of said hollow base member are flexibly joined to each other with a lateral (side-to-side) offset, and (b) a region of said hollow handle member is defined with a bend such that said first distal end of said hollow handle member has substantially zero lateral offset relative to a longitudinal axis of said base member.

20. The stowable device of claim 11, further including at least one wheel attached to said hollow base member in a manner selected from a group consisting of (a) said wheel is attached without a lateral (side-to-side) offset relative to a longitudinal axis of said hollow base member, (b) said wheel is attached with a lateral (side-to-side) offset relative to a longitudinal axis of said hollow base member, and (c) attachment of said wheel includes means for protecting said wheel from intrusion by debris.

\* \* \* \* \*